June 12, 1923.
G. D. FAULDS
1,458,283
FURNACE FOR MELTING METALS
Filed Oct. 26, 1920
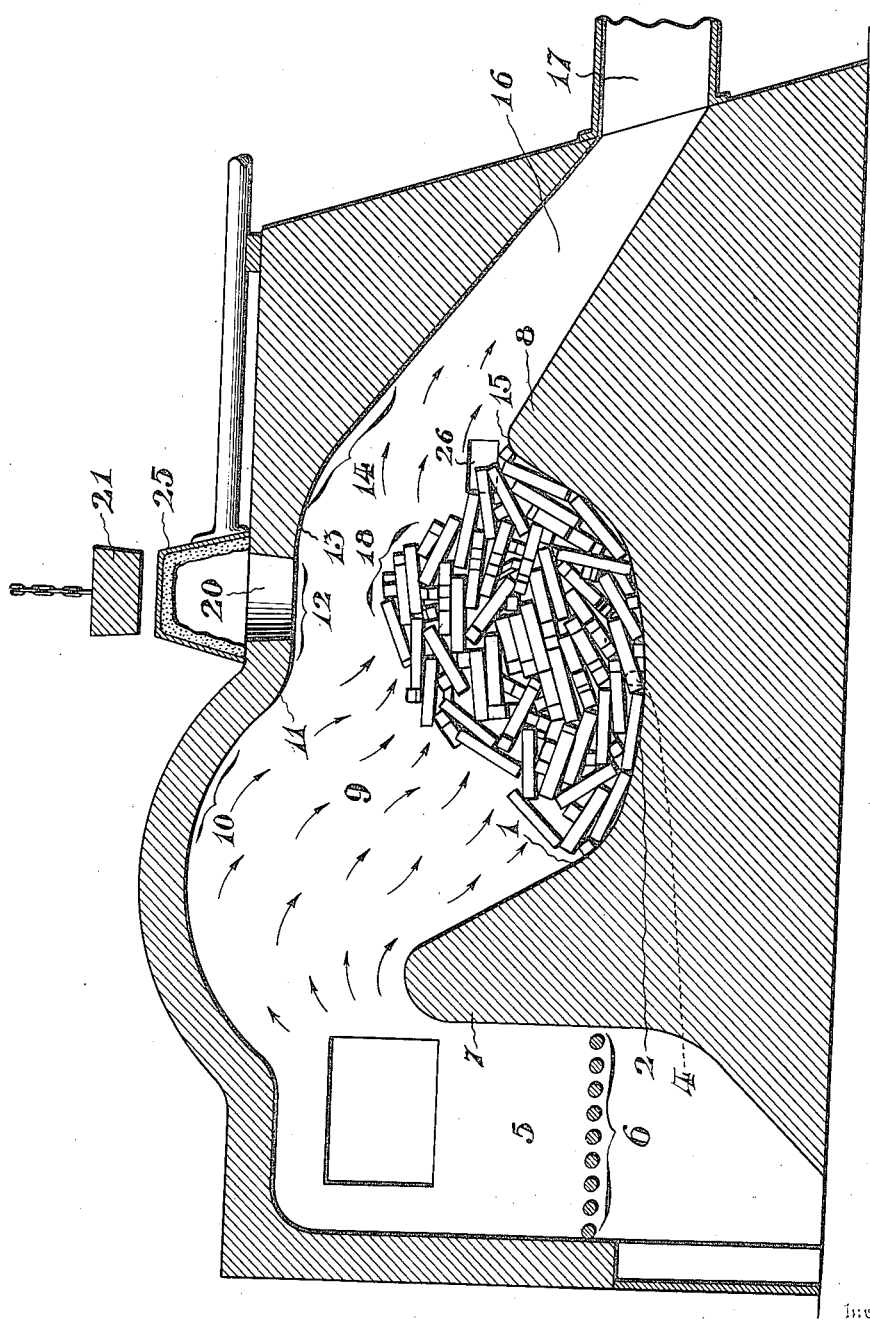
George D. Faulds, Patented June 12, 1923.

1,458,283

UNITED STATES PATENT OFFICE.

GEORGE D. FAULDS, OF PHILADELPHIA, PENNSYLVANIA.

FURNACE FOR MELTING METALS.

Application filed October 26, 1920. Serial No. 419,647.

*To all whom it may concern:*

Be it known that I, GEORGE D. FAULDS, a citizen of the United States, residing in Philadelphia, in the county of Philadelphia and State of Pennsylvania, have invented certain new and useful Improvements in Furnaces for Melting Metals, whereof the following is a specification, reference being had to the accompanying drawing.

My invention relates to furnaces and methods for melting metals, especially brass, bronze, lead, and the like. It is my aim to obviate the need of crucibles for melting such metals; to reduce the cost; to enable the operation to be carried on continuously with the utmost convenience and rapidity; and to obviate or minimize the danger and annoyance from fumes. Accordingly, I melt the metal in or on a pot or fusion hearth, which can be incorporated in the furnace structure itself, and can be inexpensively constructed of a couple of layers or courses of firebrick on dry sand.

I have hereinafter described in detail the best embodiment and method of practicing my invention at present known to me with special reference to the melting of brass,— since this is an application wherein the advantages of the invention are strikingly apparent, in view of the grave disadvantages of prior practice,—indicating in my claims the scope and essentials of the invention in its various phases and aspects.

The drawing shows a somewhat diagrammatic vertical longitudinal section through a melting furnace constructed in accordance with my invention. The furnace shown is especially well adapted to the melting of small amounts of metal—such as 100 to 500 lbs.—in brass foundries.

The furnace here shown comprises a fusion hearth or pot 1 with slightly rounded bottom 2 and sloping sides. At the lowest part of the hearth 1 is a tap or draw-off 4 for the molten metal. The source of heat for melting the metal here shown is an ordinary firebox 5 with grate bars 6 for the combustion of coal or other solid fuel,—although heat from some other source may, of course, be used. This firebox 5 is situated in front of the fusion hearth 1 and separated from it by a relatively high bridge wall 7 whose sloping rear face forms the front side or wall of said hearth. At the rear of the fusion hearth 1 is a wall 8 lower than the bridge wall 7, but having, like it, a sloping front face that forms the rear side or wall of said hearth. Unlike known metallurgical furnaces for other purposes (such as smelting, puddling, etc.), the hearth or pot 1 of my melting furnace is here shown as relatively deep in proportion to its area, in correspondence with its function as a reservoir of molten metal. The fusion chamber 9, consequently, is deep or high.

The roof of the furnace is curved or arched from front to rear over the bridge wall 7 and the front portion of the hearth 1. The downward and rearward-sloping roof section 10 thus formed extends to a point 11 over the central portion of the hearth 1,—as shown, indeed, over its very centre. At this point 11, the furnace roof turns rather sharply, with a slightly rounded corner, and extends about horizontal at 12, a short distance rearward. From a point 13 over the rear portion of the hearth 1, the roof curves and slopes downward, at 14, over the rear wall and edge 15 of the hearth 1, forming or merging into a downward sloping and extending discharge or exit flue 16 for the gases, that leads to a stack or chimney connection 17. The downward and rearward-sloping roof section 10 acts to deflect and direct downward toward the hearth 1, the current of hot gases coming from in front of the bridge wall 7, and the downward and rearward-sloping discharge 14, 16, again, acts to deflect, crowd and draw the current of hot gases on downward over the rear edge 15 of the hearth 1, so as to prevent any tendency for the hot gases to short circuit across the upper portion of the fusion chamber 1. This deflecting and discharging means 14, 16, therefore, insures full effect for the deflection of the hot gases downward upon the metal being melted by means of the roof section 10, so that the hot gases shall be drawn through the midst of the pile of metal pieces 18. To insure the utmost effect in this regard, the discharge 16 may extend downward to a point where its upper wall intersects and passes below an imaginary line drawn through the crests of the walls 7 and 8.

The gases are not permitted to rise from the hearth after their deflection downward at 10, 11, but are kept down in contact with the metal 18. To look at the matter in another light, the forward portion of the roof cooperates with the bridge wall 7 to form a flaring passage for the products of combustion that slopes upward from the source of heat over said bridge wall and then downward, and cooperates with the rear portion of the hearth 2 and the wall 8 to afford a contracting downward passage for keeping and directing the gases down over said rear wall.

In the substantially horizontal roof section or region 12, over the rear portion of the hearth 1, is an opening 20 for charging metal to be melted on to the hearth. This charging opening 20 is sheltered from the current of gases through the furnace by the deflecting corner at 11; indeed, there may even be a slight tendency for suction of air into the furnace when the cover 21 of this opening is raised. In any case, therefore, there is no substantial tendency for hot gases and fumes from the molten metal to come off from the furnace,—as in the case of ordinary crucible melting of brass.

In operation, the furnace may first be well heated and bars or other pieces of brass then charged in through the opening 20, so as to form on the hearth 1 a pile 18 higher, even, than its wall 8. The current of hot gases through the furnace will be drawn downward and directed through the midst of this pile (as described above), rapidly fusing the metal down into the bottom of the hearth or pot. As fusion progresses, and the top of the pile descends, more metal may periodically be charged down on the hearth from above, and the molten metal may be periodically drawn off from beneath, through the tap 4. Under some conditions, of course, the operation may preferably be conducted so slowly as to fuse down the metal to a horizontal free surface in the pot 1 after each charging ere the next charging; also, the periodic charges may be so small as never to pile up above such free surface, or may even melt almost instantly on contact with the hot body of molten metal,—which may, of course, be super-heated to a temperature exceeding its melting point.

When the furnace is tapped, the molten metal may be run out into a vessel such as a fair sized ladle 25 for pouring. This ladle 25 may be heated after each pouring by placing it upside down over the opening 20, in the place of the cover 21. Charging may be done while the pouring is in progress, and the ladle 25 may be heated after each pouring while the freshly charged metal is being melted. The ladle 25 may advantageously be an ordinary cast iron one of good capacity, lined to a thickness of $\frac{1}{2}''$ to $\frac{3}{4}''$ with gravel or coarse sand (applied wet), or with fire-clay. Its lining may be painted with wet blackening such as used for moulds.

The progress of fusion on the hearth 1 and the condition of the molten metal may be observed through the peep-opening or hole 26 in the side wall of the fusion chamber,—here shown as located about opposite the rear edge 15 of the hearth 1.

Having thus described my invention, I claim:

1. A melting furnace having a combustion chamber and comprising a relatively deep fusion hearth, a high front bridge wall between the hearth and combustion chamber, a curved top wall to direct the hot gases over the bridge wall and then downward upon the hearth, and a sloping outlet passage to conduct the gases away from the hearth in a continuing downward direction, said top wall having a filling opening located above the hearth and toward the rear side, whereby the material fed through said opening may pile upon the hearth to partially constrict said passage and also to present a broad side exposed to direct contact with the gases coming from the combustion chamber to hasten fusion.

2. A melting furnace having a combustion chamber, and comprising a relatively deep fusion hearth, a high front bridge wall between the hearth and combustion chamber, and a low rear wall, a curved top wall to direct the hot gases over the bridge wall and downward upon the hearth, a substantially horizontal portion forming a continuation of said curved top wall and having a filling opening formed therein, and a sloping passage to conduct the gases away from the hearth in a continuing downward direction, said horizontal portion forming a pocket to prevent the escape of heat when the filling opening is uncovered.

In testimony whereof, I have hereunto signed my name at Philadelphia, Pennsylvania, this 15th day of October, 1920.

GEORGE D. FAULDS.

Witnesses:
GEORGE H. POWER,
THOMAS A. COONEY.